United States Patent [19]

Benton et al.

[11] Patent Number: 4,872,370
[45] Date of Patent: Oct. 10, 1989

[54] PISTON ROD ASSEMBLY INCLUDING PRELOADED PISTON HEAD AND COMPOSITE ROD

[75] Inventors: Terry L. Benton; John H. Matthews, both of Portage, Mich.

[73] Assignee: Pneumo Abex Corporation, Boston, Mass.

[21] Appl. No.: 34,841

[22] Filed: Apr. 6, 1987

[51] Int. Cl.⁴ .............................. G05G 1/00; F16J 1/00
[52] U.S. Cl. ...................................... 74/579 E; 92/222; 92/260; 403/271; 403/360
[58] Field of Search .................... 74/579 R, 579 E; 92/172, 222, 231, 260, 248, 255, 259; 403/375, 360, 271, 272, 273; 123/193 P

[56] References Cited

U.S. PATENT DOCUMENTS

| | | | |
|---|---|---|---|
| 351,565 | 10/1886 | Ball | 92/255 |
| 532,529 | 1/1895 | Carr | 92/255 |
| 1,379,775 | 5/1921 | Murphy | 74/579 X |
| 1,386,144 | 8/1921 | Wall | 92/231 X |
| 2,599,082 | 6/1952 | Wells | 92/260 X |
| 2,772,932 | 12/1956 | Muckley | 92/260 |
| 3,140,642 | 7/1964 | Nelson et al. | 92/248 |
| 3,426,656 | 2/1969 | Bimba | 92/255 |
| 3,426,657 | 2/1969 | Bimba | 92/255 |
| 3,594,024 | 7/1971 | Hertell | 403/345 X |
| 3,698,264 | 10/1972 | York | 92/255 X |
| 3,867,871 | 2/1975 | Shore | 403/261 X |
| 4,632,590 | 12/1986 | Tsuchimoto | 403/179 X |
| 4,683,810 | 8/1987 | Afimiwala | 92/222 X |

FOREIGN PATENT DOCUMENTS

| | | | |
|---|---|---|---|
| 2609817 | 9/1977 | Fed. Rep. of Germany | 92/222 |
| 2045389 | 10/1980 | United Kingdom | 92/255 |

Primary Examiner—Rodney M. Lindsey
Attorney, Agent, or Firm—Renner, Otto, Boisselle & Sklar

[57] ABSTRACT

Piston rod assembly includes a composite piston rod having an entrapment ridge along the length thereof, and a non-integral metallic piston head having two separate piston head sections which are welded together in preloaded engagement against opposite sides of the entrapment ridge. The entrapment ridge has oppositely facing external tapered ramp surfaces which are engaged by correspondingly tapered internal ramp surfaces on the respective piston head sections. When the piston head sections are initially brought into engagement with opposite sides of the entrapment ridge, there is a slight gap between the inner faces on the piston head sections which determines the amount of preload force that must be applied to the piston head sections to eliminate the gap and bring the inner faces into substantial mating engagement with each other for welding.

14 Claims, 1 Drawing Sheet

PISTON ROD ASSEMBLY INCLUDING PRELOADED PISTON HEAD AND COMPOSITE ROD

BACKGROUND OF THE INVENTION

This invention relates generally as indicated to a piston rod assembly including a piston head and composite rod, and to the method of assembling such piston head onto such rod. The piston head is desirably made of metal and includes two separate sections which are slid onto the rod from opposite ends and forced toward one another up against opposite sides of an entrapment ridge on the composite rod to provide a desired compression preload at the interface therebetween.

Making the piston rod out of fibrous composite materials has the advantage that the weight of the piston rod can be substantially reduced without sacrificing strength. This can be particularly beneficial, for example, when the piston rod is used in fluid actuators for flight controls for high performance aircraft and other high pressure applications. However, this necessitates that the piston head be formed separately from the piston rod. Accordingly, an effective method of attaching the piston head to the composite rod must be provided.

SUMMARY OF THE INVENTION

With the foregoing in mind, it is a principal object of this invention to provide a piston rod assembly including a composite piston rod and metallic piston head and method of assembly that ensures the integrity and structural rigidity required for high pressure applications.

Another object is to provide such a piston rod assembly and method of assembly which does not require a separate seal between the piston head and rod.

In accordance with one aspect of the invention, the piston head is formed in two separate sections which are pushed up against opposite sides of an entrapment ridge on the composite rod and preloaded to establish a desired compressive preload at the interface between such rod and piston head.

Also in accordance with the invention, the opposite sides of the entrapment ridge have oppositely facing external tapered ramp surfaces for mating engagement by correspondingly tapered internal ramp surfaces on the two piston head sections.

In accordance with another aspect of the invention, the piston head sections are clamped against opposite sides of the entrapment ridge and then welded together to support the desired preload as well as any external load that may be applied to the piston rod assembly during use.

Further in accordance with the invention, the amount of preload may be determined by providing a slight gap between the piston head sections when snubbed up tight against the entrapment ridge but prior to applying the required preload force to bring the two piston head sections into substantial mating engagement with each other.

Also in accordance with the invention, the piston head sections are desirably welded together around the entire peripheral extent of the composite rod to seal the composite rod from any fluid passing between the piston head sections.

Further in accordance with the invention, each piston head section may be provided with an integral rod sleeve portion which may be shrink fitted onto the composite rod to eliminate any gaps therebetween thus providing a barrier between the rod sleeve portions and composite rod impermeable to such fluid.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
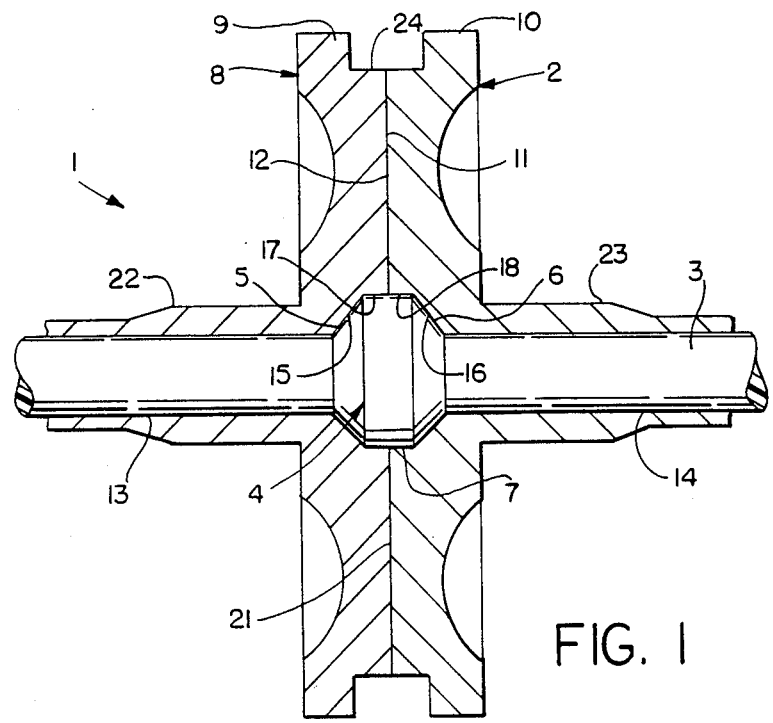
FIG. 1 is a schematic fragmentary longitudinal section through a preferred form of piston rod assembly in accordance with this invention.

Referring now in detail to the drawings, and initially to FIG. 1, there is schematically shown a preferred form of piston rod assembly 1 in accordance with this invention which may be used, for example, in fluid actuators for flight controls for aircraft and other high pressure applications. Piston rod assembly 1 includes a piston head 2 preferably made of a suitable metal such as stainless steel and a rod 3 preferably made of relatively high strength-to-weight fibrous composite materials such as high modulus graphite filament wound fibers impregnated with a suitable resin such as epoxy, polyester, polyimide, etc. The rod 3 is formed with an entrapment ridge 4 along the length thereof having oppositely facing external tapered ramp surfaces 5, 6 connected together by an external cylindrical surface 7, for a purpose to be subsequently described. Entrapment ridge 4 is integral with the rod 3 and is thus fixed relative thereto as shown.

Piston head 2 includes a center dam portion 8 formed in two sections 9, 10 each having a generally flat radial inner face 11, 12 in mating engagement with each other. Both sections 9, 10 are desirably approximately one-half the axial length of the center dam portion 8 and have central openings 13, 14 substantially corresponding to the outer diameter (O.D.) of the composite rod 3 adjacent opposite ends of the entrapment ridge 4. At the adjacent ends of the central openings 13, 14 are internal tapered ramp surfaces 15, 16 substantially corresponding in shape to the oppositely facing ramp surfaces 5, 6 of the entrapment ridge 4. At the radial outer ends of the ramp surfaces 15, 16 are cylindrical surfaces 17, 18 having an inner diameter (I.D.) substantially corresponding to the O.D. of the external cylindrical surface 7 of the entrapment ridge 4.

Figure 2:
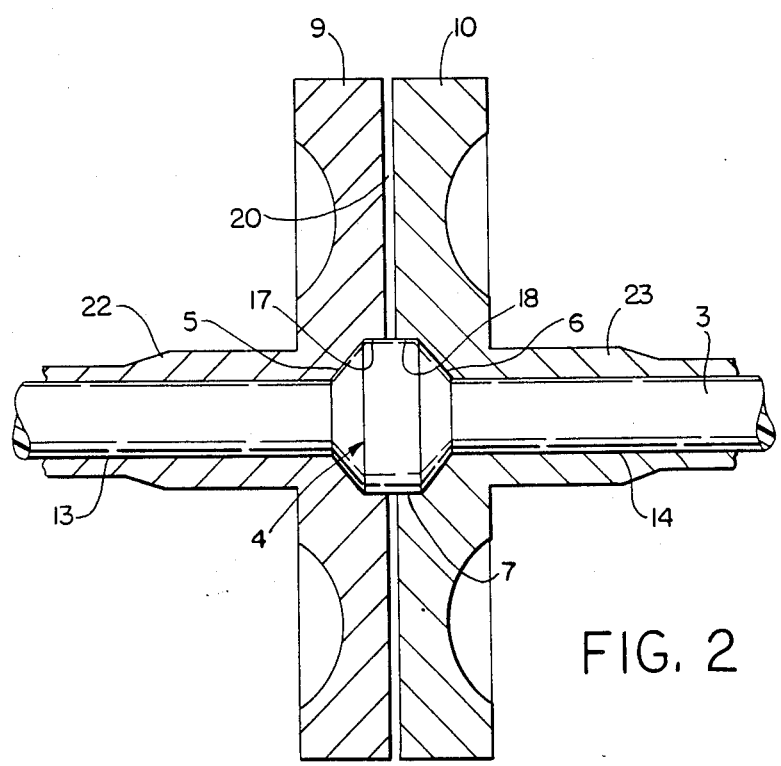
FIG. 2 is a schematic fragmentary longitudinal section similar to FIG. 1 but showing a gap between the piston head sections when snubbed up tight against an entrapment ridge on the piston rod but prior to applying the required preload force to the piston head to bring the two piston head sections into mating engagement with each other.

During the manufacture of the piston head sections 9, 10, the axial length of each of the cylindrical surfaces 17, 18 is desirably made slightly less than one-half the initial axial length of the external cylindrical surface 7 on the entrapment ridge 4. Accordingly, when the two piston head sections 9, 10 are slid over opposite ends of the piston rod 3 and the ramp surfaces 15, 16 are brought into engagement with the oppositely facing ramp surfaces 5, 6 on the entrapment ridge 4, there will be a slight gap 20 between the radial inner faces 11, 12 of the piston head sections as schematically shown in FIG. 2. Gap 20 may be substantially eliminated by applying a sufficient force to the piston head sections to bring the inner faces 11, 12 of the piston head sections into mating engagement with each other as shown in FIG. 1. This produces a compressive preload between the metallic piston head sections and composite rod which may be controlled to ensure the integrity and structural rigidity of the piston rod assembly necessary for a particular application. The amount of preload may be determined by the width of the gap 20 which exists between the piston head sections 9, 10 when they are snubbed up tight against the entrapment ridge 4 but prior to preloading as shown in FIG. 2.

During application of the preload, such preload may be maintained by clamping the two piston head sections 9, 10 together. Preferably, the clamping load is distributed substantially uniformly around the two piston head sections so that no significant detrimental moments will occur tending to unload any portion of the piston head-rod interface. While thus clamped, the mating faces 11, 12 of the piston head sections 9, 10 may be welded together as by means of an electron beam which produces a weld strength sufficient to support the preload and any external load that may be applied to the piston rod assembly 1 during use. Preferably, the weld 21 is made to extend between the mating faces 11, 12 completely around the periphery of the entrapment ridge 4 to seal the composite rod 3 against any external fluid passing between such mating faces.

Also, a suitable coating, plating or shell may be provided around the O.D. of the piston rod 3 to form a sealing surface against fluid intrusion into the piston rod composite material. In the preferred embodiment disclosed herein, such sealing surface is formed by providing each piston head section 9, 10 with an integral rod sleeve portion 22, 23 which completely covers the remaining exterior surface of the composite rod exposed to such fluid. During the assembly process, the rod sleeve portions 22, 23 may be shrink fitted onto the rod 3 to provide a compressive preload between the rod sleeve portions and rod thus eliminating any gaps therebetween.

After the assembly has been completed, an annular sealing groove 24 may be machined in the O.D. of the center dam portion 8. Also, if desired, the external surface of the piston head 2 and integral rod sleeve portions 22, 23 may be chrome plated for increased wear.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A piston rod assembly comprising a piston rod made of fibrous composite material and a metallic piston head, said piston rod having an entrapment ridge intermediate the length thereof, said piston head including two separate sections, and means for maintaining said piston head sections in preloaded engagement against opposite sides of said entrapment ridge.

2. The assembly of claim 1 wherein said entrapment ridge is integral with said rod.

3. The assembly of claim 1 wherein said entrapment ridge is fixed relative to said rod.

4. The assembly of claim 3 wherein said entrapment ridge has oppositely facing external ramp surfaces engaged by internal ramp surfaces on the respective piston head sections.

5. A piston rod assembly comprising a piston rod and non-integral piston head, said piston rod being made of composite material, and said piston head being made of metal, said piston rod having an entrapment ridge intermediate its length, and said piston head including two separate piston head sections maintained in preloaded engagement against opposite sides of said entrapment ridge by weld means joining said piston head sections together radially outwardly of said entrapment ridge.

6. A piston rod assembly comprising a piston rod made of composite material and a metallic piston head, said piston rod having an entrapment ridge intermediate the length thereof, said piston head including two separate sections, and means for maintaining said piston head sections in preloaded engagement against opposite sides of said entrapment ridge, said entrapment ridge having oppositely facing external ramp surfaces engaged by internal ramp surfaces on the respective piston head sections.

7. The assembly of claim 6 wherein said entrapment ridge includes an external cylindrical surface extending between said external ramp surfaces.

8. The assembly of claim 7 wherein said piston head sections include internal cylindrical surfaces at the radial outer ends of said internal ramp surfaces surrounding said external cylindrical surface on said entrapment ridge.

9. A piston rod assembly comprising a piston rod made of composite material and a metallic piston head, said piston rod having an entrapment ridge intermediate the length thereof, said piston head including two separate sections, and means for maintaining said piston head sections in preloaded engagement against opposite sides of said entrapment ridge, said piston head sections having substantially flat radial inner faces in substantial mating engagement with each other exteriorly of said entrapment ridge which are joined together by weld means.

10. The assembly of claim 9 wherein said weld means between said inner faces extends around the entire periphery of said entrapment ridge to seal against passage of hydraulic fluid between said piston head sections into contact with said rod.

11. A piston rod assembly comprising a piston rod made of composite material and a metallic piston head, said piston rod having an entrapment ridge intermediate the length thereof, said piston head including two separate sections, and means for maintaining said piston head sections in preloaded engagement against opposite sides of said entrapment ridge, each of said piston head sections being approximately one-half the axial length of said piston head, said piston head sections having radially extending inner faces joined together in substantial mating engagement by weld means.

12. The assembly of claim 11 wherein said weld means extends completely around the periphery of said entrapment ridge.

13. The assembly of claim 12 further comprising an external seal groove in said piston head radially outwardly of said weld means.

14. The assembly of claim 11 further comprising rod sleeve portions integral with said piston head, said rod sleeve portions extending from opposite sides of said piston head over a substantial portion of the length of said rod to provide a barrier around said rod impermeable to hydraulic fluid.

* * * * *